(12) United States Patent
Liu et al.

(10) Patent No.: US 11,395,260 B2
(45) Date of Patent: Jul. 19, 2022

(54) SCHEDULING BROADCAST OR MULTICAST COMMUNICATIONS FOR NEW RADIO

(71) Applicant: QUALCOMM Incorporated, San Diego, CA (US)

(72) Inventors: Le Liu, Fremont, CA (US); Alberto Rico Alvarino, San Diego, CA (US); Kazuki Takeda, Tokyo (JP); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 16/947,031

(22) Filed: Jul. 15, 2020

(65) Prior Publication Data

US 2021/0037500 A1 Feb. 4, 2021

Related U.S. Application Data

(60) Provisional application No. 62/882,257, filed on Aug. 2, 2019.

(51) Int. Cl.
*H04W 72/00* (2009.01)
*H04W 72/04* (2009.01)
(Continued)

(52) U.S. Cl.
CPC ......... *H04W 72/005* (2013.01); *H04L 1/1819* (2013.01); *H04L 5/0092* (2013.01);
(Continued)

(58) Field of Classification Search
CPC ........... H04W 72/005; H04W 4/06–08; H04W 76/40
See application file for complete search history.

(56) References Cited

U.S. PATENT DOCUMENTS

2011/0038299 A1* 2/2011 Sugawara ............... H04W 4/08
370/312
2019/0261139 A1 8/2019 Fujishiro et al.
(Continued)

FOREIGN PATENT DOCUMENTS

WO WO-2018084194 A1 5/2018
WO WO-2018084785 A1 5/2018

OTHER PUBLICATIONS

Huawei., et al., "Discussion on NPDCCH Search Space for Multicast in NB-IoT," 3GPP Draft, 3GPP TSG RAN WG1 Meeting #86bis, R1-1608614, 3rd Generation Partnership Project (3GPP), Mobile Competence Centre, 650, Route Des Lucioles, F-06921, Sophia-Antipolis Cedex, France, vol. RAN WG1. No. Lisbon. Portugal, Oct. 10, 2016-Oct. 14, 2016, Oct. 9, 2016 (Oct. 9, 2016), XP051148673, 5 pages, Retrieved from the Internet: URL: http://www.3gpp.org/ftp/Meetings_3GPP_SYNC/RAN1/Docs/ [retrieved on Oct. 9, 2016] p. 1. paragraph 2 p. 1; figure 1.
(Continued)

*Primary Examiner* — Marcus Smith
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment (UE) may receive a broadcast or a multicast (broadcast/multicast) scheduling configuration for a physical downlink control channel (PDCCH), the broadcast/multicast scheduling configuration identifying, for receiving broadcast/multicast communications, at least one of: a plurality of radio network temporary identifiers that are respectively associated with a plurality of beams, or one or more bandwidth parts. The UE may receive a broadcast/multicast communication associated with a broadcast/multicast control channel or a broadcast/multicast traffic channel via a physical down-
(Continued)

link shared channel in accordance with the broadcast/multicast scheduling configuration for the PDCCH. Numerous other aspects are provided.

30 Claims, 7 Drawing Sheets

(51) Int. Cl.
*H04L 1/18* (2006.01)
*H04L 5/00* (2006.01)
*H04W 76/11* (2018.01)
*H04W 72/12* (2009.01)

(52) U.S. Cl.
CPC ....... *H04W 72/042* (2013.01); *H04W 72/046* (2013.01); *H04W 72/0493* (2013.01); *H04W 72/1268* (2013.01); *H04W 76/11* (2018.02)

(56) References Cited

U.S. PATENT DOCUMENTS

| | | | |
|---|---|---|---|
| 2019/0268879 A1* | 8/2019 | Lee | H04W 72/02 |
| 2020/0204329 A1* | 6/2020 | Fujishiro | H04L 1/1861 |
| 2020/0267511 A1* | 8/2020 | Abdoli | H04L 5/0094 |
| 2021/0144516 A1* | 5/2021 | Kim | H04W 72/12 |

OTHER PUBLICATIONS

Huawei., et al., "New Work Item on NR Multicast and Broadcast Services," 3GPP Draft, 3GPP TSG RAN Meeting #86, New WID on NR Multicast and Broadcast Services, 3rd Generation Partnership Project (3GPP), Mobile Competence Centre, 650, Route Des Lucioles, F-06921, Sophia-Antipolis Cedex, France, vol. TSG RAN. No. Newport Beach. USA, Dec. 9, 2019-Dec. 12, 2019, Jun. 2, 2019 (Jun. 2, 2019), XP051747225, 5 pages, Retrieved from the Internet: URL: http://www.3gpp.org/ftp/Meetings%5F3GPP%5FSYNC/RAN/Docs/RP%2D191012%2Ezip [retrieved on Jun. 2, 2019] p. 2. line 2. paragraph 4.1—line 6.
International Search Report and Written Opinion—PCT/US2020/070282—ISA/EPO—dated Sep. 16, 2020.

* cited by examiner

SCHEDULING BROADCAST OR MULTICAST COMMUNICATIONS FOR NEW RADIO

CROSS-REFERENCE TO RELATED APPLICATION

This Patent Applications claims priority to U.S. Provisional Patent Application No. 62/882,257, filed on Aug. 2, 2019, entitled "SCHEDULING BROADCAST OR MULTICAST COMMUNICATIONS FOR NEW RADIO," and assigned to the assignee hereof. The disclosure of the prior Applications is considered part of and is incorporated by reference into this Patent Applications.

FIELD OF THE DISCLOSURE

Aspects of the present disclosure generally relate to wireless communication, and to techniques and apparatuses for scheduling broadcast or multicast communications for New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some cases, wireless networks may support broadcast communication, in which a communication is provided to all UEs of a cell, or multicast communication, in which a communication is provided to a group of UEs. Broadcast or multicast (broadcast/multicast) communications may be useful for broad dissemination of information, such as emergency alerts, audio content, or video content. However, there may not be mechanisms for scheduling broadcast/multicast communications from multiple cells or using multiple beams. Moreover, there may not be mechanisms for retransmission of broadcast/multicast communications to particular UEs when broadcast/multicast traffic is multiplexed with unicast traffic.

SUMMARY

In some aspects, a method of wireless communication, performed by a user equipment (UE), may include receiving a broadcast or a multicast (broadcast/multicast) scheduling configuration for a physical downlink control channel (PDCCH), the broadcast/multicast scheduling configuration identifying, for receiving broadcast/multicast communications, at least one of: a plurality of radio network temporary identifiers (RNTIs) that are respectively associated with a plurality of beams, or one or more bandwidth parts (BWPs); and receiving a broadcast/multicast communication associated with a broadcast/multicast control channel (MCCH) or a broadcast/multicast traffic channel (MTCH) via a physical downlink shared channel (PDSCH) in accordance with the broadcast/multicast scheduling configuration for the PDCCH.

In some aspects, a method of wireless communication, performed by a base station, may include transmitting, to a plurality of UEs, a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs; and transmitting, to the plurality of UEs, a broadcast/multicast communication associated with an MCCH or an MTCH via a PDSCH in accordance with the broadcast/multicast scheduling configuration for the PDCCH.

In some aspects, a UE for wireless communication may include memory and one or more processors operatively coupled to the memory. The memory and the one or more processors may be configured to receive a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs; and receive a broadcast/multicast communication associated with an MCCH or an MTCH via a PDSCH in accordance with the broadcast/multicast scheduling configuration for the PDCCH.

In some aspects, a base station for wireless communication may include memory and one or more processors operatively coupled to the memory. The memory and the one or more processors may be configured to transmit, to a plurality of UEs, a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs; and transmit, to the plurality of UEs, a broadcast/multicast communication associated with an MCCH or an MTCH via a PDSCH in accordance with the broadcast/multicast scheduling configuration for the PDCCH.

In some aspects, a non-transitory computer-readable medium may store one or more instructions for wireless communication. The one or more instructions, when executed by one or more processors of a UE, may cause the one or more processors to receive a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs; and receive a broadcast/multicast communication associated with an MCCH or an MTCH via a PDSCH in accordance with the broadcast/multicast scheduling configuration for the PDCCH.

In some aspects, a non-transitory computer-readable medium may store one or more instructions for wireless communication. The one or more instructions, when executed by one or more processors of a base station, may cause the one or more processors to transmit, to a plurality of UEs, a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs; and transmit, to the plurality of UEs, a broadcast/multicast communication associated with an MCCH or an MTCH via a PDSCH in accordance with the broadcast/multicast scheduling configuration for the PDCCH.

In some aspects, an apparatus for wireless communication may include means for receiving a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs; and means for receiving a broadcast/multicast communication associated with an MCCH or an MTCH via a PDSCH in accordance with the broadcast/multicast scheduling configuration for the PDCCH.

In some aspects, an apparatus for wireless communication may include means for transmitting, to a plurality of UEs, a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs; and means for transmitting, to the plurality of UEs, a broadcast/multicast communication associated with an MCCH or an MTCH via a PDSCH in accordance with the broadcast/multicast scheduling configuration for the PDCCH.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
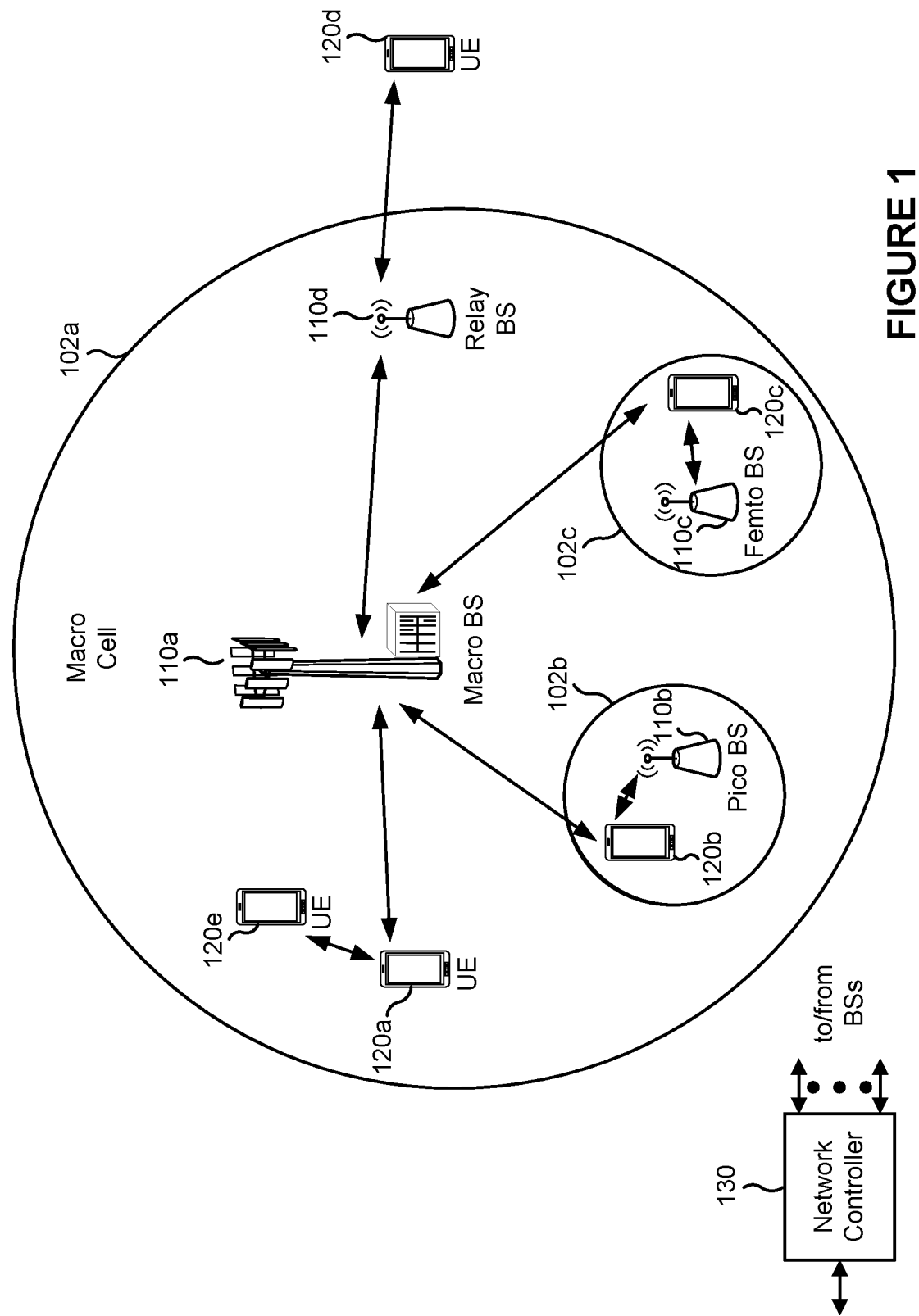
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

Some wireless networks may support broadcast or multicast (broadcast/multicast) communication, which may be useful for broad dissemination of information, such as emergency alerts, audio content, or video content. However, there may not be mechanisms for scheduling broadcast/multicast communications from multiple cells or using multiple beams. Moreover, there may not be mechanisms for retransmission of broadcast/multicast communications to a particular user equipment (UE) when broadcast/multicast traffic is multiplexed with unicast traffic.

Some techniques and apparatuses described herein facilitate scheduling broadcast/multicast communications. For example, a scheduling configuration for broadcast/multicast communications may define a plurality of radio network temporary identifiers (RNTIs) for a broadcast/multicast service (for example, for broadcast/multicast communications), each of which are mapped to a particular beam, to enable a UE to receive broadcast/multicast communications using multiple beams. As another example, the scheduling configuration may define a mapping of unicast hybrid automatic repeat request (HARQ) process identifiers to multicast HARQ process identifiers to enable retransmission of a broadcast/multicast communication to a particular UE. In addition, some techniques and apparatuses described herein facilitate scheduling broadcast/multicast communications from multiple cells (for example, multiple cells of a single frequency network (SFN)). In this way, performance, reliability, and efficiency of broadcast/multicast communications may be improved.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of base stations (BSs) 110 (shown as BS 110a, BS 110b, BS 110c, and BS 110d) and other network entities. A BS is an entity that communicates with UE(s) and may also be referred to as a Node B, an eNodeB, an eNB, a gNB, a NR BS, a 5G node B (NB), an access point (AP), a transmit receive point (TRP), or the like, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, relay BSs, or the like, or combinations thereof. These different types of BSs may have different transmit power levels, different coverage areas, and different impacts on interference in the wireless network. For example, macro BSs may have a high transmit power level (for example, 5 to 40 Watts) whereas pico BSs, femto BSs, and relay BSs may have lower transmit power levels (for example, 0.1 to 2 Watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, a virtual network, or the like, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, or the like, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, a station, or the like, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, or the like, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, or the like, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier or the like, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like, or combinations thereof), a mesh network, or the like, or combinations thereof. In this case, the UE 120 may perform scheduling operations, resource selection operations, or other operations described elsewhere herein as being performed by the base station 110.

Figure 2:
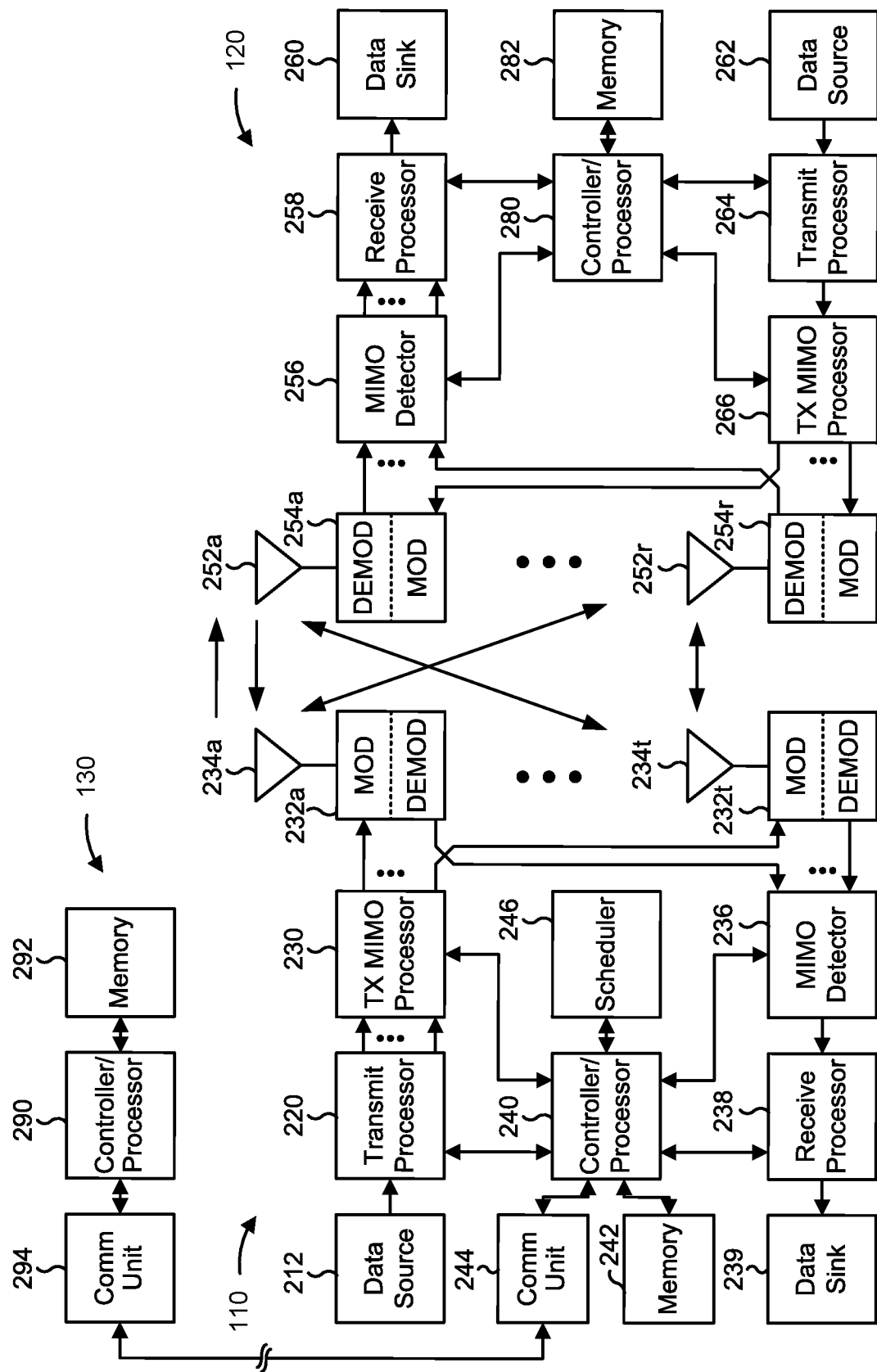
FIG. 2 is a block diagram illustrating an example base station (BS) in communication with a user equipment (UE) in a wireless network in accordance with various aspects of the present disclosure.

FIG. 2 is a block diagram illustrating an example base station (BS) in communication with a user equipment (UE) in a wireless network in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) or the like, or combinations thereof) and control information (for example, CQI requests, grants, upper layer signaling, or the like, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each MOD 232 may process a respective output symbol stream (for example, for OFDM or the like, or combinations thereof) to obtain an output sample stream. Each MOD 232 may further process (for example, convert to analog, amplify, filter, and upconvert) the output sample stream to obtain a downlink signal. T downlink signals from MODs 232*a* through 232*t* may be transmitted via T antennas 234*a* through 234*t*, respectively. In accordance with various aspects described in more detail below, the synchronization signals can be generated with location encoding to convey additional information.

At UE 120, antennas 252*a* through 252*r* may receive the downlink signals from base station 110 or other base stations and may provide received signals to R demodulators (DE-MODs) 254*a* through 254*r*, respectively. Each DEMOD 254 may condition (for example, filter, amplify, downconvert, and digitize) a received signal to obtain input samples. Each DEMOD 254 may further process the input samples (for example, for OFDM or the like, or combinations thereof) to obtain received symbols. A MIMO detector 256 may obtain received symbols from all R DEMODs 254*a* through 254*r*, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), or the like, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, or the like, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254*a* through 254*r* (for example, for discrete Fourier transform spread orthogonal frequency division multiplexing (DFT-s-OFDM), orthogonal frequency division multiplexing (OFDM) with a cyclic prefix (CP) (CP-OFDM), or the like, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with scheduling broadcast or multicast communications, as described in more detail elsewhere herein. For example, controller/processor 240 of base station 110, controller/ processor 280 of UE 120, or any other component(s) of FIG. 2 may perform or direct operations of, for example, the process of FIG. 4, the process of FIG. 5, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving a broadcast/multicast scheduling configuration for a physical downlink control channel (PDCCH), the broadcast/multicast scheduling configuration identifying, for receiving broadcast/multicast communications, at least one of: a plurality of RNTIs that are respectively associated with a plurality of beams, or one or more bandwidth parts (BWPs), means for receiving a broadcast/multicast communication associated with a broadcast/multicast control channel (MCCH) or a broadcast/multicast traffic channel (MTCH) via a physical downlink shared channel (PDSCH) in accordance with the broadcast/multicast scheduling configuration for the PDCCH, or the like, or combinations thereof. In some aspects, such means may include one or more components of UE 120 described in connection with FIG. 2.

In some aspects, base station 110 may include means for transmitting, to a plurality of UEs, a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs, means for transmitting, to the plurality of UEs, a broadcast/multicast communication associated with an MCCH or an MTCH via a PDSCH in accordance with the broadcast/multicast scheduling configuration for the PDCCH, or the like, or combinations thereof. In some aspects, such means may include one or more components of base station 110 described in connection with FIG. 2.

Some wireless networks may support broadcast/multicast communications, which may be useful for broad dissemination of information, such as emergency alerts, audio content, or video content. However, there may not be mechanisms for scheduling broadcast/multicast communications from multiple cells or using multiple beams. Moreover, there may not be mechanisms for retransmission of broadcast/multicast communications to a particular UE when broadcast/multicast traffic is multiplexed with unicast traffic.

Some techniques and apparatuses described herein facilitate scheduling broadcast/multicast communications. For example, a scheduling configuration for broadcast/multicast communications may define a plurality of RNTIs for a broadcast/multicast service, each of which are mapped to a particular beam, to enable a UE to receive broadcast/multicast communications using multiple beams. As another example, the scheduling configuration may define a mapping of unicast HARQ process identifiers to multicast HARQ process identifiers to enable retransmission of a broadcast/multicast communication to a particular UE. In addition, some techniques and apparatuses described herein facilitate scheduling broadcast/multicast communications from multiple cells. In this way, performance, reliability, and efficiency of broadcast/multicast communications may be improved.

Figure 3:
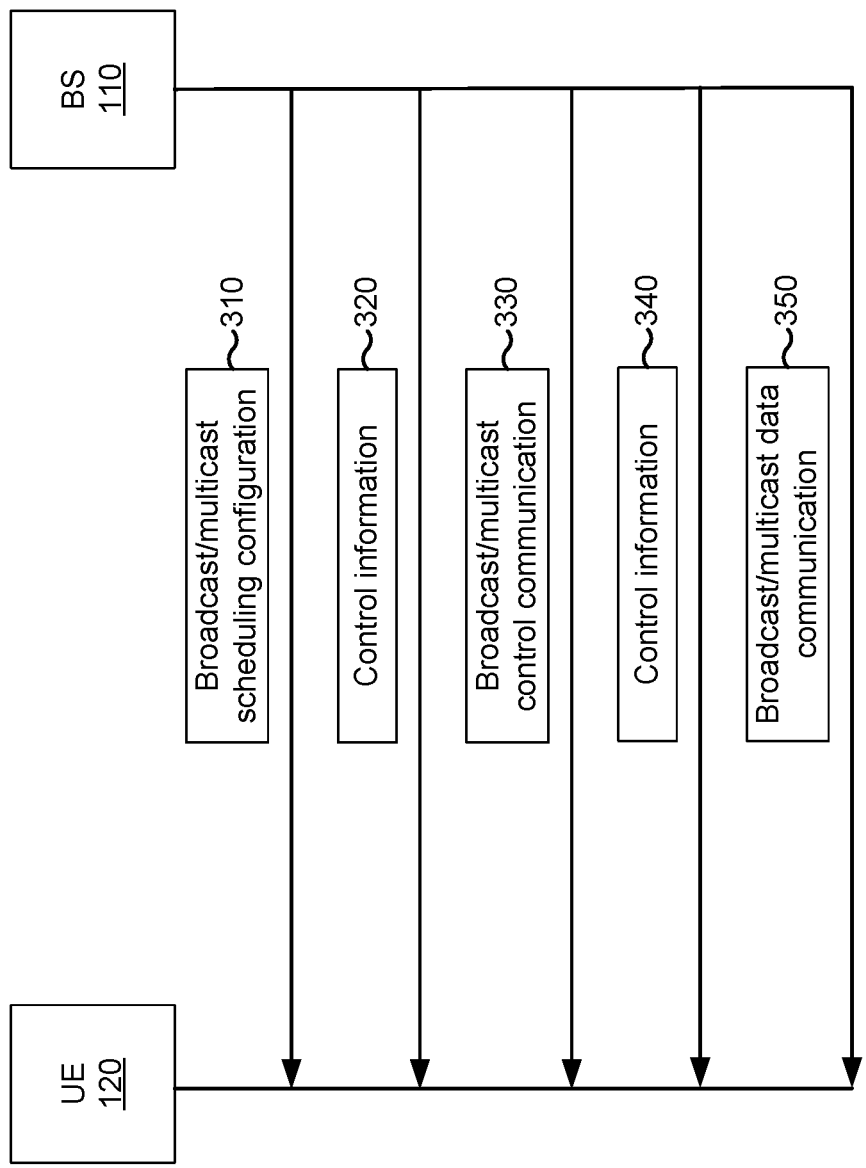
FIG. 3 is a diagram illustrating an example of scheduling broadcast or multicast communications in accordance with various aspects of the present disclosure.

FIG. 3 is a diagram illustrating an example of scheduling broadcast/multicast communications in accordance with various aspects of the present disclosure. As shown in FIG. 3, a base station 110 may schedule and transmit a broadcast/multicast communication to a UE 120. In some aspects, the UE 120 may be one of a plurality of UEs associated with a cell or a multicast group, and the base station 110 may schedule and transmit a broadcast/multicast communication to the plurality of UEs.

In some aspects, the base station 110 may transmit a broadcast/multicast control communication that provides control information associated with a broadcast/multicast data communication. The broadcast/multicast control communication may be carried in a logical channel associated with broadcast/multicast control communications. For example, the logical channel may be an MCCH that is carried in a PDSCH. The broadcast/multicast data communication may be carried in a logical channel associated with broadcast/multicast data communications. For example, the logical channel may be an MTCH that is carried in the PDSCH.

The broadcast/multicast control communication of the MCCH and the broadcast/multicast data communication of the MTCH each may be scheduled by downlink control information (DCI) carried in a PDSCH. A cyclic redundancy check (CRC) of the DCI scheduling the broadcast/multicast control communication of the MCCH may be scrambled by a multicast RNTI (M-RNTI). A CRC of the DCI scheduling the broadcast/multicast data communication of the MTCH may be scrambled by a group RNTI (G-RNTI).

As shown in FIG. 3, in a first operation 310, the base station 110 may transmit, and the UE 120 may receive, a broadcast/multicast scheduling configuration. For example, the base station 110 may transmit the broadcast/multicast scheduling configuration in response to a broadcast/multicast interest indication message received from the UE 120. The broadcast/multicast interest indication message may include a temporary mobile group identifier (TMGI) or a quality of service (QoS) identifier that identifies a broadcast/multicast service to which the UE 120 is to be subscribed. As another example, the base station 110 may broadcast the broadcast/multicast scheduling configuration to all UEs in a cell served by the base station 110.

The base station 110 may transmit the broadcast/multicast scheduling configuration via a system information block (SIB) or radio resource control (RRC) signaling carried in the PDSCH. The broadcast/multicast scheduling configuration may include scheduling information for obtaining DCI carried on the PDCCH. In addition, the broadcast/multicast scheduling configuration may define one or more broadcast/multicast parameters for the UE 120. The one or more broadcast/multicast parameters may be associated with obtaining the broadcast/multicast control communication on the MCCH or obtaining the broadcast/multicast data communication on the MTCH.

In some aspects, the broadcast/multicast scheduling configuration may identify a plurality of RNTIs associated with a broadcast/multicast service (for example, a broadcast/multicast service identified by a TMGI or a QoS identifier). The plurality of RNTIs may include a first set of RNTIs that are associated with the MCCH (for example, M-RNTIs) or a second set of RNTIs that are associated with the MTCH (for example, G-RNTIs). Moreover, each RNTI of the plurality of RNTIs may identify a respective beam of a plurality of beams (for example, a plurality of transmission configuration indicator (TCI) states corresponding to the plurality of beams). In this way, the base station 110 may transmit a communication for a broadcast/multicast service using multiple beams, thereby improving reliability and network capacity for broadcast/multicast communications.

In some aspects, the broadcast/multicast scheduling configuration may identify time-domain scheduling information (for example, one or more configurations for a time-domain resource allocation). For example, the broadcast/multicast scheduling configuration may identify a periodicity or a window duration associated with the DCI carried on the PDCCH. As another example, the broadcast/multicast scheduling configuration may provide information to enable the UE 120 to identify repetitions of a broadcast/multicast communication. In some aspects, the broadcast/multicast scheduling configuration may configure particular quantities of repetitions for particular beams (for example, particular TCI states). For example, the broadcast/multicast scheduling configuration may configure a greater quantity of repetitions for a wider beam (for example, a wider beam used to transmit the broadcast/multicast control communication of the MCCH) and a lesser quantity of repetitions for a narrower beam (for example, a narrower beam used to transmit the broadcast/multicast data communication of the MTCH). Moreover, the broadcast/multicast scheduling configuration may identify a plurality of time offsets associated with a plurality of beams (for example, the plurality of beams associated with the plurality of RNTIs). For example, a time offset may identify a slot or a symbol in which a particular beam is to transmit a broadcast/multicast communication. The plurality of time offsets may include a first set of time offsets that are associated with the MCCH or a second set of time offsets that are associated with the MTCH.

In some aspects, the broadcast/multicast scheduling configuration may identify frequency-domain scheduling information (for example, one or more configurations for a frequency-domain resource allocation). For example, the broadcast/multicast scheduling configuration may identify one or more BWPs in which the UE 120 is to receive a broadcast/multicast communication. The one or more BWPs may include a first set of BWPs that are associated with the MCCH or a second set of BWPs that are associated with the MTCH. In some aspects, the first set of BWPs and the second set of BWPs may be the same or different (for example, the first set and the second set may differ by at least one BWP). In addition, the broadcast/multicast scheduling configuration may identify a frequency-hopping pattern. For example, the frequency-hopping pattern may identify a pattern of frequencies within a BWP, or across multiple BWPs, on which the UE 120 is to receive a broadcast/multicast communication, thereby improving transmission diversity for the broadcast/multicast communication.

In some aspects, the broadcast/multicast scheduling configuration may identify a plurality of control resource set (CORESET) configurations and search space configurations for a BWP. A CORESET configuration may include a beam configuration (for example, a TCI state of a beam). The plurality of CORESET configurations and search space configurations may include a first set of CORESET configurations and search space configurations that are associated with the MCCH and a second set of CORESET configurations and search space configurations associated with the MTCH.

In some aspects, the broadcast/multicast scheduling configuration may identify (for example, for a UE in a connected mode (RRC CONNECTED)) a mapping of unicast HARQ process identifiers to broadcast/multicast HARQ process identifiers (for example, virtual broadcast/multicast HARQ process identifiers). For example, the mapping may identify a relationship between a particular HARQ process identifier associated with a cell RNTI (C-RNTI) for unicast transmissions and a particular HARQ process identifier associated with a G-RNTI or an M-RNTI for broadcast/multicast transmissions. In this way, the mapping enables the UE 120 to receive unicast retransmissions of a broadcast/multicast communication.

In some aspects, the broadcast/multicast scheduling configuration may identify a demodulation reference signal (DMRS) scrambling identifier, which may be used as an identifier of a single cell or an identifier of multiple cells of an SFN. A default value of the DMRS scrambling identifier may be a physical cell identifier of a serving cell. In some aspects, the broadcast/multicast scheduling configuration may identify a timeline configuration relating to a timeline for processing of the PDCCH, receiving a broadcast/multicast communication, and transmitting acknowledgment (ACK) or negative ACK (NACK) feedback to the broadcast/multicast communication. In such cases, the timeline may be configured to have a different duration than a corresponding unicast timeline. For example, the timeline may have a greater duration than a corresponding unicast timeline, thereby providing additional time (relative to unicast) for the base station 110 to determine whether a broadcast/multicast communication is to be retransmitted by broadcast/multicast or unicast. In some aspects, a duration of the timeline may be greater than a slowest processing time among UEs receiving a broadcast/multicast communication (for example, based at least in part on reported UE capabilities).

In a second operation 320, the base station 110 may transmit, and the UE 120 may receive, DCI associated with the MCCH. For example, the UE 120 may monitor the PDCCH in accordance with the broadcast/multicast scheduling configuration in order to obtain the DCI. The DCI may include a downlink grant for accessing a broadcast/multicast control communication of the MCCH on the PDSCH.

The DCI may identify (for example, according to a selection made by the base station 110) a particular broadcast/multicast parameter that the UE 120 is to use to obtain the broadcast/multicast control communication on the MCCH. In some aspects, the DCI may identify a particular RNTI (for example, an M-RNTI) of the plurality of RNTIs configured in the scheduling configuration. For example, the DCI may be scrambled by the identified RNTI. As described above, the identified RNTI may correspond to a particular beam (for example, a particular TCI state). Additionally, the DCI may identify a particular time offset of the plurality of time offsets configured in the scheduling configuration. The identified time offset may identify a slot or a symbol in which the particular beam is to transmit the broadcast/multicast control communication. In this way, the DCI may indicate a particular beam or time offset that the UE 120 is to use to obtain the broadcast/multicast control communication, which may be useful when the UE 120 is in overlapping beam coverage.

In some aspects, the DCI may identify a particular BWP of the plurality of BWPs configured in the scheduling configuration. The identified BWP, for example, may be associated with a particular broadcast/multicast service, a particular QoS, or a particular PDSCH configuration. In some aspects, the DCI may identify a particular CORESET configuration and search space configuration of the plurality of CORESET configurations and search space configurations configured in the scheduling configuration. The identified CORESET configuration and search space configuration may be associated with the particular BWP. In addition, the DCI may identify a particular resource block (RB) allocation in the identified BWP.

In some aspects, the DCI may identify a particular MCS that the UE 102 is to use to decode the broadcast/multicast control communication. Moreover, the DCI may identify a HARQ process identifier that the UE 102 is to use for the broadcast/multicast control communication. The identified HARQ process identifier for the broadcast/multicast control communication may be mapped to a particular unicast HARQ process identifier in the broadcast/multicast scheduling configuration, as described above.

In some aspects, the DCI may be in DCI format 1_0 or 1_1. In some aspects, the DCI, in format 1_0, may be in a compact format that is scrambled by a particular M-RNTI (for example, a multicast new RNTI (M-N-RNTI)) defined for indicating a change to a broadcast/multicast control communication. In such a compact format, the DCI may allocate 8 bits to indicate a change to a broadcast/multicast control communication and may allocate 2 bits to indicate an update of system information.

In a third operation 330, the base station 110 may transmit, and the UE 120 may receive, the broadcast/multicast control communication. For example, the UE 120 may monitor the PDSCH in accordance with the DCI in order to obtain the broadcast/multicast control communication on the MCCH. The broadcast/multicast control communication may identify a TMGI for the broadcast/multicast service, a broadcast/multicast session identifier, a G-RNTI used to scramble DCI associated with the MTCH, and a broadcast/multicast scheduling configuration. The broadcast/multicast scheduling configuration may include scheduling information for the DCI associated with the MTCH, and in some cases may define, or redefine, one or more of the broadcast/multicast parameters for the UE 120, as described above.

In some aspects, the UE 120 may receive the broadcast/multicast control communication from a single cell (for example, the base station 110 may be included in the single cell) of a wireless network. In such a case, the UE 120 may receive the broadcast/multicast control communication based at least in part on whether the wireless network supports the MCCH.

In a scenario in which the wireless network does not support the MCCH, the UE 120 may receive the broadcast/multicast control communication via a SIB or RRC signaling from the single cell. For example, if the UE 120 is in a connected mode, the UE 120 may receive (for example, in response to a request made by the UE 120 for a broadcast/multicast service) the broadcast/multicast control communication via RRC signaling (for example, unicast RRC signaling). In such a case, scheduling in the PDCCH for the broadcast/multicast control communication may be provided by DCI scrambled by a C-RNTI. As another example, if the UE 120 is in an inactive mode or an idle mode, the UE 120 may receive the broadcast/multicast control communication via a SIB. In such a case, scheduling in the PDCCH for the broadcast/multicast control communication may be provided by DCI scrambled by a system information RNTI (SI-RNTI). In some aspects, the SIB may use a particular SI-RNTI defined for broadcast/multicast.

In a case in which the wireless network supports the MCCH, the broadcast/multicast control communication may be carried in the MCCH and scheduled in the PDCCH by DCI scrambled by an M-RNTI (for example, an M-RNTI corresponding to a particular beam selected by the base station 110), as described above. Furthermore, in such a case, the UE 120 may monitor the PDCCH for the DCI using a CORESET configuration and search space configuration associated with the single cell.

In some aspects, the UE 120 may receive the broadcast/multicast control communication from multiple cells (for example, multiple cells of an SFN). In such a case, the DCI carried in the PDCCH may be provided by a serving cell (for example, the base station 110 may be included in the serving cell) of the multiple cells, or by the multiple cells. In a scenario in which the DCI is provided by the serving cell, the UE 120 may monitor the PDCCH for the DCI using a CORESET configuration and search space configuration indicated in a broadcast/multicast scheduling configuration transmitted by the serving cell. In a scenario in which DCIs are provided by the multiple cells, the UE 120 may monitor the PDCCH for the DCIs using CORESET configurations and search space configurations indicated in broadcast/multicast scheduling configurations transmitted from the multiple cells. In some aspects, a first set of multiple cells may transmit the DCIs and a second set of multiple cells may transmit the broadcast/multicast control communication. The first set of multiple cells and the second set of multiple cells may be the same or different (for example, the first set and the second set may differ by at least one cell).

In some aspects, the UE 120 may transmit ACK or NACK feedback for the broadcast/multicast control communication to the base station 110. For example, the UE 120 may transmit NACK feedback to the broadcast/multicast control communication using a broadcast/multicast HARQ process identifier associated with the broadcast/multicast control communication. In some aspects, the base station 110 may determine to retransmit the broadcast/multicast control communication as one or more unicast retransmissions or as a broadcast/multicast retransmission based at least in part on a quantity of NACK feedback messages received from UEs.

For example, the base station 110 may determine that the quantity of NACK feedback messages to the broadcast/multicast control communication satisfies a threshold value, and may retransmit the broadcast/multicast control communication as a broadcast/multicast retransmission using the broadcast/multicast HARQ process identifier. Alternatively, the base station 110 may determine that the quantity of NACK feedback messages to the broadcast/multicast control communication does not satisfy a threshold value (for example, if the UE 120 was the only UE reporting NACK feedback), and may retransmit the broadcast/multicast control communication as a unicast retransmission, using a unicast HARQ process identifier, to the UE 120. In such a case, the base station 110 may use the mapping of unicast HARQ process identifiers and broadcast/multicast HARQ process identifiers indicated in the broadcast/multicast scheduling configuration to select the unicast HARQ process identifier associated with the broadcast/multicast control communication. Moreover, the UE 120 may receive the unicast retransmission and identify the unicast retransmission as a retransmission of the broadcast/multicast control communication based at least in part on the mapping of unicast HARQ process identifiers and broadcast/multicast HARQ process identifiers indicated in the broadcast/multicast scheduling configuration.

In a fourth operation 340, the base station 110 may transmit, and the UE 120 may receive, DCI associated with the MTCH. For example, the UE 120 may monitor the PDCCH in accordance with the broadcast/multicast control communication in order to obtain the DCI. The DCI may include a downlink grant for accessing a broadcast/multicast data communication on the PDSCH.

The DCI may identify (for example, according to a selection made by the base station 110) a particular broadcast/multicast parameter that the UE 120 is to use to obtain the broadcast/multicast data communication, in a manner similar to that described above in connection with the DCI for the MCCH. For example, the DCI may identify an RNTI (for example, a G-RNTI) from a plurality of RNTIs indicated in the broadcast/multicast scheduling configuration. As another example, the DCI may identify a time offset from a plurality of time offsets indicated in the broadcast/multicast scheduling configuration. As a further example, the DCI may identify a BWP from a plurality of BWPs indicated in the broadcast/multicast scheduling configuration. As an additional example, the DCI may identify a CORESET configuration and search space configuration from a plurality of CORESET configurations and search space configurations indicated in the broadcast/multicast scheduling configuration.

In addition, the DCI may identify a particular MCS that the UE 102 is to use to decode the broadcast/multicast data communication. Moreover, the DCI may identify a HARQ process identifier that the UE 102 is to use for the broadcast/multicast data communication. The identified HARQ process identifier for the broadcast/multicast data communication may be mapped to a particular unicast HARQ process identifier in the broadcast/multicast scheduling configuration, as described above.

In this way, the broadcast/multicast scheduling configuration enables the base station 110 to select different broadcast/multicast parameters for the broadcast/multicast control communication on the MCCH and the broadcast/multicast data communication on the MTCH. For example, the base station 110 may select one or more wider beams for transmission of the broadcast/multicast control communication and may select one or more narrower beams for transmission of the broadcast/multicast data communication. As another example, the base station 110 may select an MCS with a lower data rate for transmission of the broadcast/multicast control communication and may select an MCS with a higher data rate for transmission of the broadcast/multicast data communication.

In a fifth operation 350, the base station 110 may transmit, and the UE 120 may receive, the broadcast/multicast data communication. For example, the UE 120 may monitor the PDSCH in accordance with the DCI in order to obtain the broadcast/multicast data communication on the MTCH. The broadcast/multicast data communication may provide an emergency alert, audio content, video content, or the like to the UE 120.

In some aspects, the UE 120 may receive the broadcast/multicast data communication from a single cell (for example, the base station 110 may be included in the single cell) of a wireless network. For example, the broadcast/multicast data communication may be carried in the MTCH and scheduled in the PDCCH by DCI scrambled by a G-RNTI (for example, a G-RNTI corresponding to a particular beam selected by the base station 110), as described above.

In some aspects, the UE 120 may receive the broadcast/multicast data communication from multiple cells (for example, multiple cells of an SFN). In such a case, the DCI carried in the PDCCH may be provided by a serving cell (for example, the base station 110 may be included in the serving cell) of the multiple cells or by the multiple cells. In a scenario in which the DCI is provided by the serving cell, the UE 120 may monitor the PDCCH for the DCI using a CORESET configuration and search space configuration indicated in a broadcast/multicast scheduling configuration transmitted by the serving cell, and the UE 120 may monitor the PDSCH for the broadcast/multicast data communication using a CORESET configuration and search space configuration indicated in a broadcast/multicast control communication transmitted by the serving cell. In a scenario in which DCIs are provided by the multiple cells, the UE 120 may monitor the PDCCH for the DCIs using CORESET configurations and search space configurations indicated in broadcast/multicast control communications transmitted by the multiple cells. In some aspects, a first set of multiple cells may transmit the DCIs and a second set of multiple cells may transmit the broadcast/multicast data communication. The first set of multiple cells and the second set of multiple cells may be the same or different (for example, the first set and the second set may differ by at least one cell).

In some aspects, the UE 120 may transmit ACK or NACK feedback for the broadcast/multicast data communication to the base station 110. For example, the UE 120 may transmit NACK feedback to the broadcast/multicast data communication using a broadcast/multicast HARQ process identifier associated with the broadcast/multicast data communication. In some aspects, the base station 110 may determine to retransmit the broadcast/multicast data communication as one or more unicast retransmissions or as a broadcast/multicast retransmission based at least in part on a quantity of NACK feedback messages received from UEs, in a manner similar to that described above for retransmission of the broadcast/multicast control communication.

Figure 4:
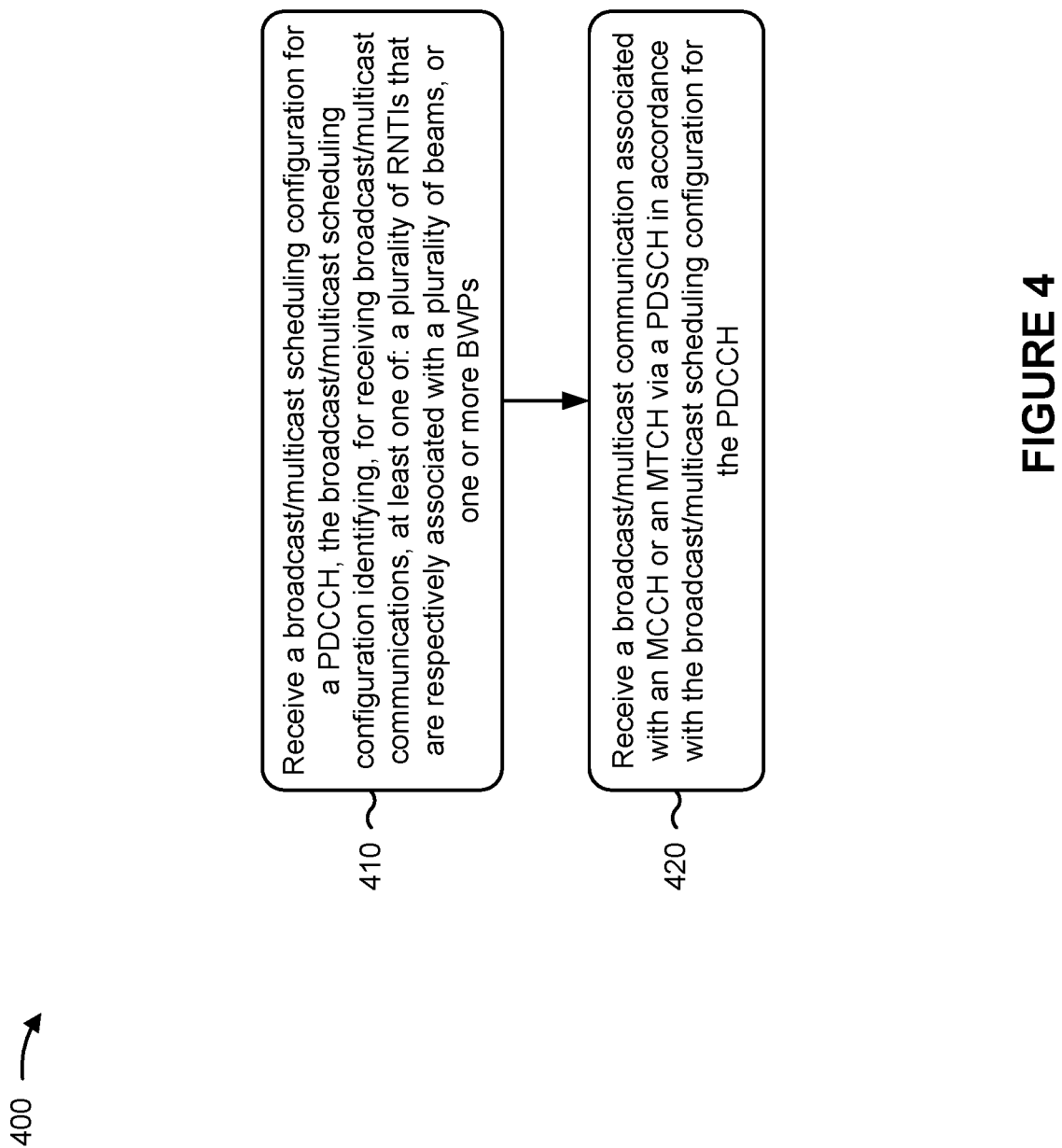
FIG. 4 is a diagram illustrating an example process performed by a UE in accordance with various aspects of the present disclosure.

FIG. 4 is a diagram illustrating an example process 400 performed, for example, by a UE, in accordance with various aspects of the present disclosure. The example process 400 is an example where a UE, such as UE 120, performs operations associated with scheduling broadcast/multicast communications.

As shown in FIG. 4, in some aspects, the process 400 may include receiving a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs (block 410). For example, the UE (using receive processor 258, controller/processor 280, or memory 282, among other possibilities/examples) may receive a broadcast/multicast scheduling configuration for a PDCCH, the broadcast/multicast scheduling configuration identifying, for receiving broadcast/multicast communications, at least one of a plurality of RNTIs that are respectively associated with a plurality of beams, or one or more BWPs, as described above.

As further shown in FIG. 4, in some aspects, the process 400 may include receiving a broadcast/multicast communication associated with an MCCH or an MTCH via a PDSCH in accordance with the broadcast/multicast scheduling configuration for the PDCCH (block 420). For example, the UE (using receive processor 258, controller/processor 280, or memory 282, among other possibilities/examples) may receive a broadcast/multicast communication associated with an MCCH or an MTCH via a PDSCH in accordance with the broadcast/multicast scheduling configuration for the PDCCH, as described above.

The process 400 of FIG. 4 may include additional aspects, such as any single aspect or any combination of aspects described below or in connection with one or more other processes described elsewhere herein.

In a first aspect, the broadcast/multicast communication is associated with an MCCH or an MTCH. In a second additional aspect, alone or in combination with the first aspect, the control channel is a PDCCH and the shared channel is a PDSCH, and the PDCCH provides scheduling for the broadcast/multicast communication associated with the MCCH or the MTCH on the PDSCH.

In a third additional aspect, alone or in combination with one or more of the first and second aspects, the broadcast/ multicast scheduling configuration identifies a plurality of RNTIs associated with broadcast/multicast communication. In a fourth additional aspect, alone or in combination with one or more of the first through third aspects, the plurality of RNTIs are multicast RNTIs relating to a broadcast/multicast control channel. In a fifth additional aspect, alone or in combination with one or more of the first through fourth aspects, the plurality of RNTIs are group RNTIs relating to a broadcast/multicast traffic channel.

In a sixth additional aspect, alone or in combination with one or more of the first through fifth aspects, each RNTI of the plurality of RNTIs identifies a respective beam of a plurality of beams for receiving the broadcast/multicast communication. In a seventh additional aspect, alone or in combination with one or more of the first through sixth aspects, the process 400 further includes receiving control information that identifies a particular RNTI of the plurality of RNTIs, and the broadcast/multicast communication is received in accordance with the particular RNTI.

In an eighth additional aspect, alone or in combination with one or more of the first through seventh aspects, the broadcast/multicast scheduling configuration identifies a plurality of time offsets associated with the plurality of beams. In a ninth additional aspect, alone or in combination with one or more of the first through eighth aspects, the process 400 further includes receiving control information that identifies a particular time offset of the plurality of time offsets, and the broadcast/multicast communication is received in accordance with the particular time offset.

In a tenth additional aspect, alone or in combination with one or more of the first through ninth aspects, the broadcast/multicast scheduling configuration provides information relating to identification of repetitions of the broadcast/multicast communication. For example, the broadcast/multicast scheduling configuration may configure particular quantities of repetitions for particular beams.

In an eleventh additional aspect, alone or in combination with one or more of the first through tenth aspects, the broadcast/multicast scheduling configuration identifies one or more BWPs for receiving the broadcast/multicast communication. In a twelfth additional aspect, alone or in combination with one or more of the first through eleventh aspects, the process 400 further includes receiving control information that identifies a particular BWP of the one or more BWPs, and the broadcast/multicast communication is received in accordance with the particular BWP.

In a thirteenth additional aspect, alone or in combination with one or more of the first through twelfth aspects, the broadcast/multicast scheduling configuration identifies a frequency-hopping pattern within a BWP or a frequency-hopping pattern across multiple BWPs. In a fourteenth additional aspect, alone or in combination with one or more of the first through thirteenth aspects, the broadcast/multicast scheduling configuration identifies a plurality of CORESET configurations and search space configurations for a bandwidth part, and a CORESET configuration of the plurality of CORESET configurations identifies a beam configuration. In a fifteenth additional aspect, alone or in combination with one or more of the first through fourteenth aspects, the process 400 further includes receiving control information that identifies a particular CORESET configuration and search space configuration of the plurality of CORESET configurations and search space configurations, and the broadcast/multicast communication is received in accordance with the particular CORESET configuration and search space configuration.

In a sixteenth additional aspect, alone or in combination with one or more of the first through fifteenth aspects, the broadcast/multicast scheduling configuration identifies a mapping of unicast HARQ process identifiers to broadcast/multicast HARQ process identifiers. Accordingly, the process 400 may further include transmitting HARQ feedback for the broadcast/multicast communication. Here, the UE may receive a unicast retransmission of the broadcast/multicast communication that identifies a unicast HARQ process identifier, which is mapped to a broadcast/multicast HARQ process identifier associated with the broadcast/multicast communication.

In a seventeenth additional aspect, alone or in combination with one or more of the first through sixteenth aspects, the broadcast/multicast scheduling configuration identifies a DMRS scrambling identifier.

In an eighteenth additional aspect, alone or in combination with one or more of the first through seventeenth aspects, the broadcast/multicast scheduling configuration identifies a timeline configuration that indicates a first time duration between processing of the PDCCH and receiving the broadcast/multicast communication, and a second time duration between receiving the broadcast/multicast communication and transmitting acknowledgment or negative-acknowledgment feedback, and each of the first time duration and the second time duration is different than a corresponding time duration for a unicast transmission.

In a nineteenth additional aspect, alone or in combination with one or more of the first through eighteenth aspects, the process 400 further includes receiving, from a single cell, control information that schedules the broadcast/multicast communication in the shared channel, and the broadcast/multicast communication is received from multiple cells of a single frequency network. In a twentieth additional aspect, alone or in combination with one or more of the first through nineteenth aspects, the control information is received via unicast signaling. In a twenty-first additional aspect, alone or in combination with one or more of the first through twentieth aspects, the process 400 further includes receiving, from a first group of one or more cells with an SFN, control information that schedules the broadcast/multicast communication in the PDSCH, and the broadcast/multicast communication is received from a second group of one or more cells with an SFN.

In a twenty-second additional aspect, alone or in combination with one or more of the first through twenty-first aspects, the process 400 further includes receiving control information scrambled by a particular RNTI, and the particular RNTI indicates a change to the broadcast/multicast communication.

Figure 5:
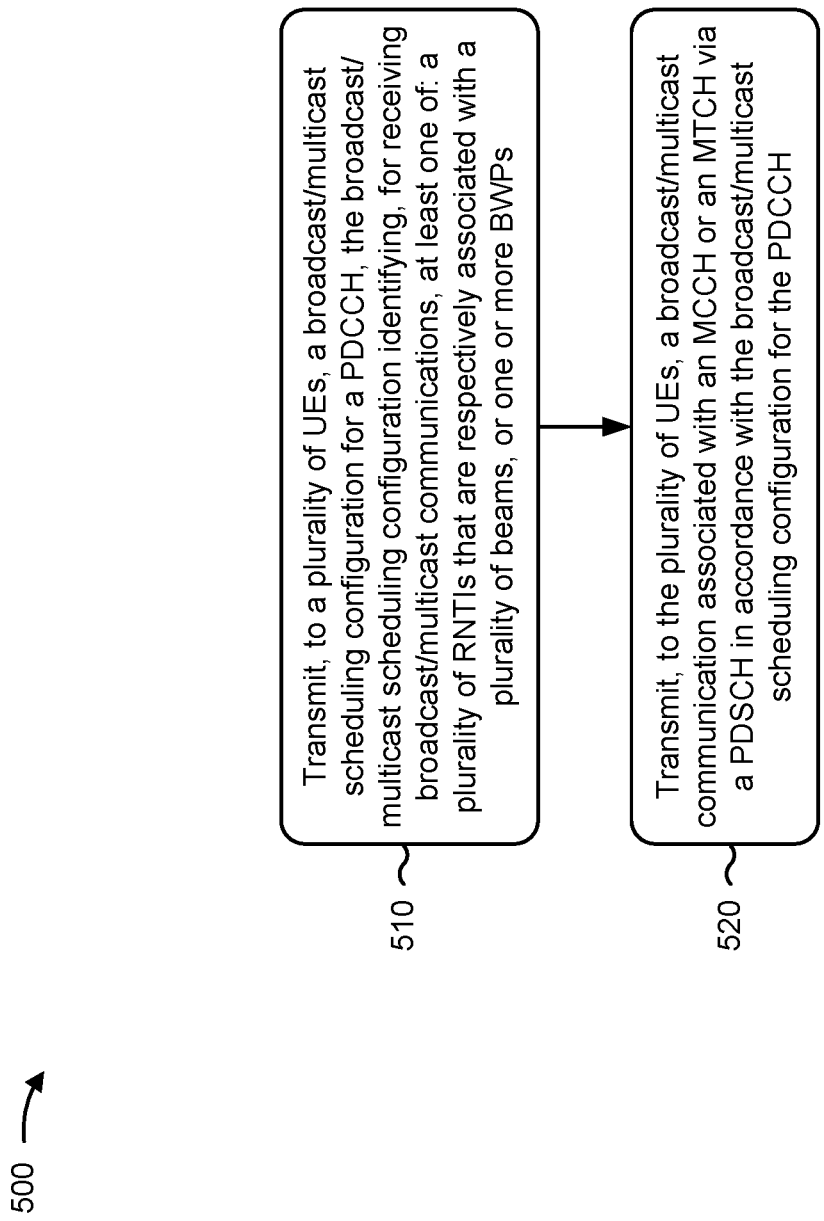
FIG. 5 is a diagram illustrating an example process performed by a base station in accordance with various aspects of the present disclosure.

FIG. 5 is a diagram illustrating an example process 500 performed, for example, by a base station, in accordance with various aspects of the present disclosure. The example process 500 is an example where a base station, such as base station 110, performs operations associated with scheduling broadcast/multicast communications.

As shown in FIG. 5, in some aspects, the process 500 may include transmitting, to a plurality of UEs, a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs (block 510). For example, the base station (using transmit processor 220, controller/processor 240, memory 242, among other possibilities/examples) may transmit, to a plurality of UEs, a broadcast/multicast scheduling configuration for a PDCCH, the broadcast/multicast scheduling configuration identifying, for receiving broadcast/multicast communications, at least one of a plurality of RNTIs that are respectively associated with a plurality of beams, or one or more BWPs, as described above.

As further shown in FIG. 5, in some aspects, the process 500 may include transmitting, to the plurality of UEs, a broadcast/multicast communication associated with an MCCH or an MTCH via a PDSCH in accordance with the broadcast/multicast scheduling configuration for the PDCCH (block 520). For example, the base station (using transmit processor 220, controller/processor 240, memory 242, among other possibilities/examples) may transmit, to the plurality of UEs, a broadcast/multicast communication associated with an MCCH or an MTCH via a PDSCH in accordance with the broadcast/multicast scheduling configuration for the PDCCH, as described above.

The process 500 of FIG. 5 may include additional aspects, such as any single aspect or any combination of aspects described below or in connection with one or more other processes described elsewhere herein.

In a first aspect, the broadcast/multicast communication is associated with an MCCH or an MTCH. In a second additional aspect, alone or in combination with the first aspect, the control channel is a PDCCH and the shared channel is a PDSCH, and the PDCCH schedules the broadcast/multicast communication associated with the MCCH or the MTCH on the PDSCH.

In a third additional aspect, alone or in combination with one or more of the first and second aspects, the broadcast/multicast scheduling configuration identifies a plurality of RNTIs associated with broadcast/multicast communication. In a fourth additional aspect, alone or in combination with one or more of the first through third aspects, the plurality of RNTIs are multicast RNTIs relating to a broadcast/multicast control channel. In a fifth additional aspect, alone or in combination with one or more of the first through fourth aspects, the plurality of RNTIs are group RNTIs relating to a broadcast/multicast traffic channel.

In a sixth additional aspect, alone or in combination with one or more of the first through fifth aspects, each RNTI of the plurality of RNTIs identifies a respective beam of a plurality of beams in which the plurality of UEs are to receive the broadcast/multicast communication. In a seventh additional aspect, alone or in combination with one or more of the first through sixth aspects, the process 500 further includes transmitting control information that identifies a particular RNTI of the plurality of RNTIs, and the broadcast/multicast communication is transmitted in accordance with the particular RNTI.

In an eighth additional aspect, alone or in combination with one or more of the first through seventh aspects, the broadcast/multicast scheduling configuration identifies a plurality of time offsets associated with the plurality of beams. In a ninth additional aspect, alone or in combination with one or more of the first through eighth aspects, the process 500 further includes transmitting control information that identifies a particular time offset of the plurality of time offsets, and the broadcast/multicast communication is transmitted in accordance with the particular time offset.

In a tenth additional aspect, alone or in combination with one or more of the first through ninth aspects, the broadcast/multicast scheduling configuration provides information relating to identification of repetitions of the broadcast/multicast communication. For example, the broadcast/multicast scheduling configuration may configure particular quantities of repetitions for particular beams.

In an eleventh additional aspect, alone or in combination with one or more of the first through tenth aspects, the broadcast/multicast scheduling configuration identifies one or more BWPs in which the plurality of UEs are to receive the broadcast/multicast communication. In a twelfth additional aspect, alone or in combination with one or more of the first through eleventh aspects, the process 500 further includes transmitting control information that identifies a particular BWP of the one or more BWPs, and the broadcast/multicast communication is transmitted in accordance with the particular BWP.

In a thirteenth additional aspect, alone or in combination with one or more of the first through twelfth aspects, the broadcast/multicast scheduling configuration identifies a frequency-hopping pattern within a BWP or a frequency-hopping pattern across multiple BWPs. In a fourteenth additional aspect, alone or in combination with one or more of the first through thirteenth aspects, the broadcast/multicast scheduling configuration identifies a plurality of CORESET configurations and search space configurations for a bandwidth part, and a CORESET configuration of the plurality of CORESET configurations identifies a beam configuration. In a fifteenth additional aspect, alone or in combination with one or more of the first through fourteenth aspects, the process 500 further includes transmitting control information that identifies a particular CORESET configuration and search space configuration of the plurality of CORESET configurations and search space configurations, and the broadcast/multicast communication is transmitted in accordance with the particular CORESET configuration and search space configuration.

In a sixteenth additional aspect, alone or in combination with one or more of the first through fifteenth aspects, the broadcast/multicast scheduling configuration identifies a mapping of unicast HARQ process identifiers to broadcast/multicast HARQ process identifiers associated with the broadcast/multicast communication. Accordingly, the process 500 may further include receiving HARQ feedback for the broadcast/multicast communication. Here, the base station may transmit a unicast retransmission of the broadcast/multicast communication that identifies a unicast HARQ process identifier, which is mapped to a broadcast/multicast HARQ process identifier associated with the broadcast/multicast communication.

In a seventeenth additional aspect, alone or in combination with one or more of the first through sixteenth aspects, the broadcast/multicast scheduling configuration identifies a DMRS scrambling identifier.

In an eighteenth additional aspect, alone or in combination with one or more of the first through seventeenth aspects, the broadcast/multicast scheduling configuration identifies a timeline configuration that indicates a first time duration between processing of the PDCCH and receiving the broadcast/multicast communication by a UE, and a second time duration between receiving the broadcast/multicast communication and transmitting acknowledgment or negative-acknowledgment feedback by a UE, and each of the first time duration and the second time duration is different than a corresponding time duration for unicast transmissions.

In a nineteenth additional aspect, alone or in combination with one or more of the first through eighteenth aspects, the process 500 further includes transmitting control information scrambled by a particular RNTI, and the particular RNTI indicates a change to the broadcast/multicast communication.

Figure 6:
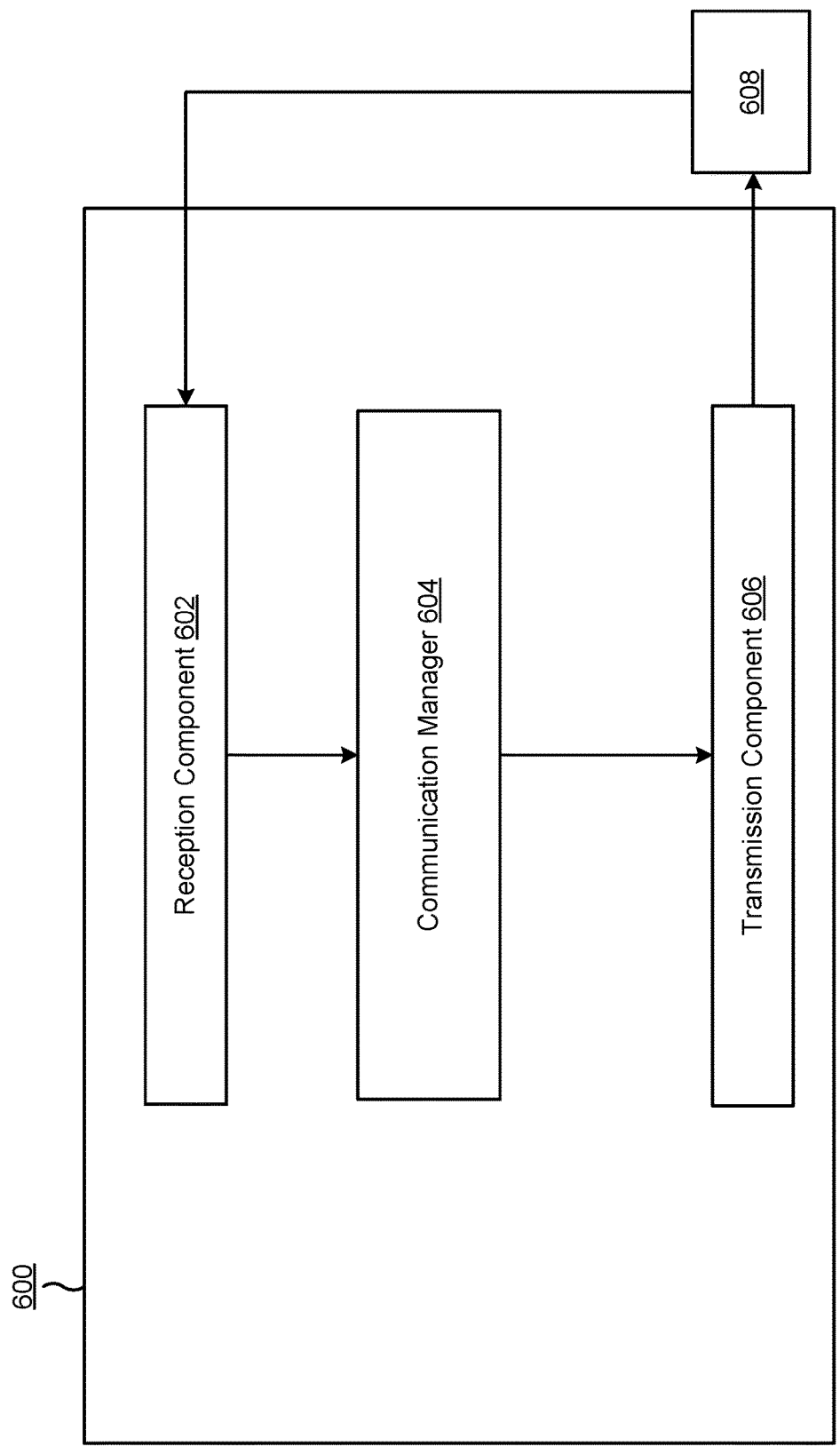
FIGS. 6 and 7 are block diagrams of example apparatuses for wireless communication in accordance with various aspects of the present disclosure.

FIG. 6 is a block diagram of an example apparatus 600 for wireless communication in accordance with various aspects of the present disclosure. The apparatus 600 may be a UE, or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIG. 3. Additionally or alternatively, the apparatus 600 may be configured to perform one or more processes described herein, such as process 400 of FIG. 4. In some aspects, the apparatus 600 may include one or more components of the UE described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 2. In some aspects, the transmission component 606 may be collocated with the reception component 602 in a transceiver.

The communication manager 604 may receive or may cause the reception component 602 to receive a broadcast/multicast scheduling configuration for a PDCCH, the broadcast/multicast scheduling configuration identifying, for receiving broadcast/multicast communications, at least one of: a plurality of RNTIs that are respectively associated with a plurality of beams, or one or more BWPs. The communication manager 604 may receive or may cause the reception component 602 to receive a broadcast/multicast communication associated with an MCCH or an MTCH via a PDSCH in accordance with the broadcast/multicast scheduling configuration for the PDCCH. In some aspects, the communication manager 604 may include a controller/processor, a memory, or a combination thereof, of the UE described above in connection with FIG. 2.

In some examples, the communication manager 604 may receive or may cause the reception component 602 to receive control information that identifies a particular RNTI of the plurality of RNTIs, and the broadcast/multicast communication is received in accordance with the particular RNTI. In some aspects, the broadcast/multicast scheduling configuration may identify a plurality of time offsets associated with the plurality of beams. In some examples, the communication manager 604 may receive or may cause the reception component 602 to receive control information that identifies a particular time offset of the plurality of time offsets, and the broadcast/multicast communication is received in accordance with the particular time offset. In some examples, the communication manager 604 may receive or may cause the reception component 602 to receive control information that identifies a particular BWP of the one or more BWPs, and the broadcast/multicast communication is received in accordance with the particular BWP.

In some aspects, the broadcast/multicast scheduling configuration identifies a plurality of CORESET configurations and search space configurations for a BWP, and a CORESET configuration of the plurality of CORESET configurations identifies a beam configuration. In some examples, the communication manager 604 may receive or may cause the reception component 602 to receive control information that identifies a particular CORESET configuration and search space configuration of the plurality of CORESET configurations and search space configurations, and the broadcast/multicast communication is received in accordance with the particular CORESET configuration and search space configuration. In some aspects, the broadcast/multicast scheduling configuration identifies a mapping of unicast HARQ process identifiers to broadcast/multicast HARQ process identifiers associated with the broadcast/multicast communication.

In some examples, the communication manager 604 may transmit or may cause the transmission component 606 to transmit HARQ feedback for the broadcast/multicast communication. In some examples, the communication manager 604 may receive or may cause the reception component 602 to receive a retransmission of the broadcast/multicast communication. In some aspects, the retransmission may be a broadcast/multicast retransmission or a unicast retransmission.

In some aspects, the communication manager 604 may include a set of components associated with performing operations described herein. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally or alternatively, a set of (one or more) components shown in FIG. 6 may perform one or more functions described as being performed by another set of components shown in FIG. 6.

Figure 7:
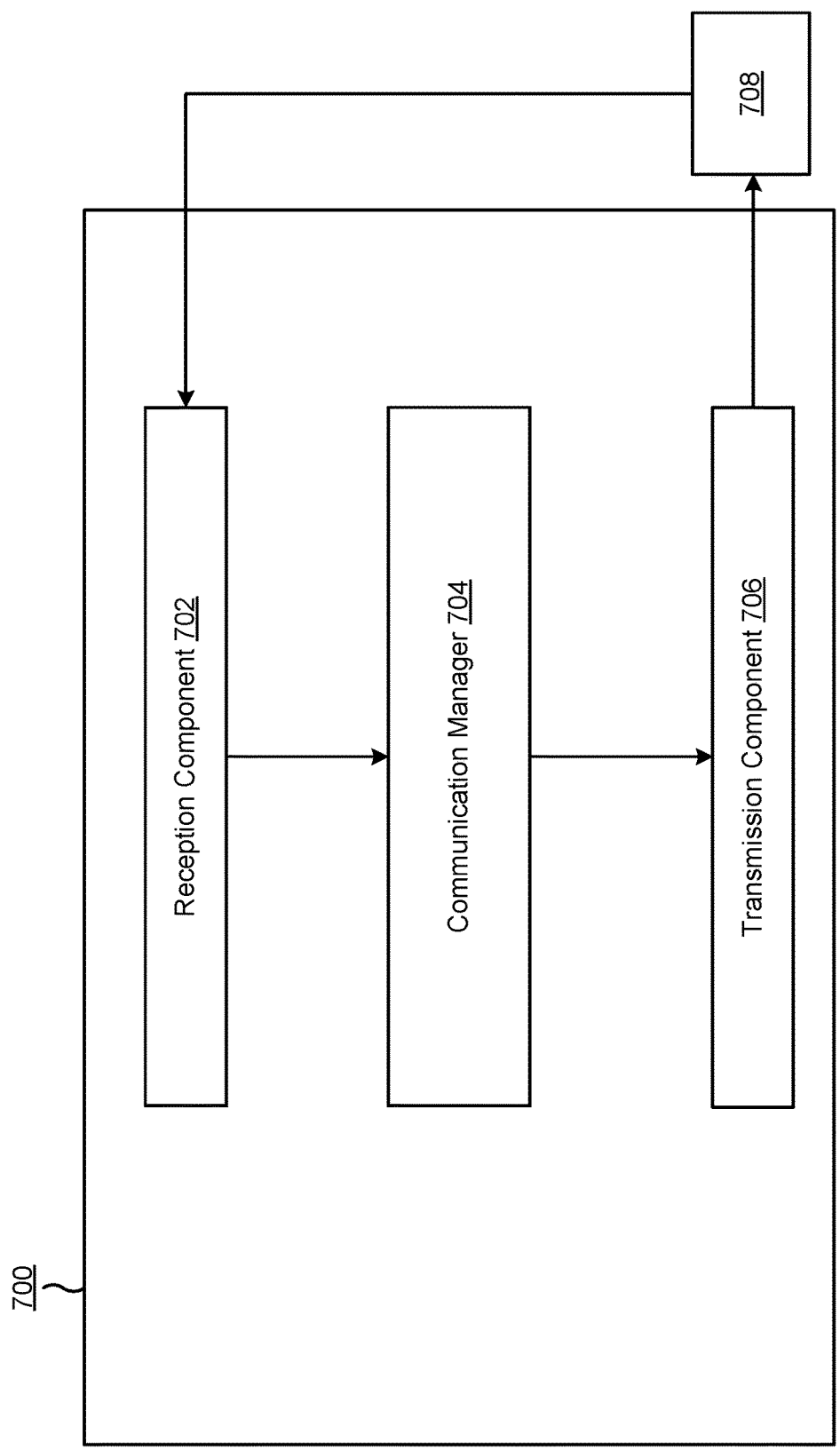

FIG. 7 is a block diagram of an example apparatus 700 for wireless communication in accordance with various aspects of the present disclosure. The apparatus 700 may be a base station, or a base station may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIG. 3. Additionally or alternatively, the apparatus 700 may be configured to perform one or more processes described herein, such as process 500 of FIG. 5. In some aspects, the apparatus 700 may include one or more components of the base station described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the BS described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the BS described above in connection with FIG. 2. In some aspects, the transmission component 706 may be collocated with the reception component 702 in a transceiver.

The communication manager 704 may transmit or may cause the transmission component 706 to transmit, to a plurality of UEs, a broadcast/multicast scheduling configuration for PDCCH, the broadcast/multicast scheduling configuration identifying, for receiving broadcast/multicast communications, at least one of: a plurality of RNTIs that are respectively associated with a plurality of beams, or one or more BWPs. The communication manager 704 may transmit or may cause the transmission component 706 to transmit, to the plurality of UEs, a broadcast/multicast communication associated with an MCCH or an MTCH via a PDSCH in accordance with the broadcast/multicast scheduling configuration for the PDCCH. In some aspects, the communication manager 704 may include a controller/processor, a memory, a scheduler, a communication unit, or a combination thereof, of the base station described above in connection with FIG. 2.

In some examples, the communication manager 704 may transmit or may cause the transmission component 706 to transmit control information that identifies a particular RNTI of the plurality of RNTIs, and the broadcast/multicast communication is transmitted in accordance with the particular RNTI. In some aspects, the broadcast/multicast scheduling configuration may identify a plurality of time offsets associated with the plurality of beams. In some examples, the communication manager 704 may transmit or may cause the transmission component 706 to transmit control information that identifies a particular time offset of the plurality of time offsets, and the broadcast/multicast communication is transmitted in accordance with the particular time offset. In some examples, the communication manager 704 may transmit or may cause the transmission component 706 to transmit control information that identifies a particular BWP of the one or more BWPs, and the broadcast/multicast communication is transmitted in accordance with the particular BWP.

In some aspects, the broadcast/multicast scheduling configuration identifies a plurality of CORESET configurations and search space configurations for a BWP, and a CORESET configuration of the plurality of CORESET configurations identifies a beam configuration. In some examples, the communication manager 704 may transmit or may cause the transmission component 706 to transmit control information that identifies a particular CORESET configuration and search space configuration of the plurality of CORESET configurations and search space configurations, and the broadcast/multicast communication is transmitted in accordance with the particular CORESET configuration and search space configuration. In some aspects, the broadcast/multicast scheduling configuration identifies a mapping of unicast HARQ process identifiers to broadcast/multicast HARQ process identifiers associated with the broadcast/multicast communication.

In some examples, the communication manager 704 may receive or may cause the reception component 702 to receive HARQ feedback for the broadcast/multicast communication. In some examples, the communication manager 704 may transmit or may cause the transmission component 706 to transmit a retransmission of the broadcast/multicast communication. In some aspects, the retransmission may be a broadcast/multicast retransmission or a unicast retransmission.

In some aspects, the communication manager 704 may include a set of components associated with performing operations described herein. In some aspects, one or more components of the set of components may include or may be implemented within a controller/processor, a memory, a scheduler, a communication unit, or a combination thereof, of the BS described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like, or combinations thereof), and may be used interchangeably with "one or more." Where only one item is intended, the phrase "only one" or similar language is used. Also, as used herein, the terms "has," "have," "having," or the like, or combinations thereof are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a broadcast or a multicast (broadcast/multicast) scheduling configuration for a physical downlink control channel (PDCCH),
      the broadcast/multicast scheduling configuration identifying, for receiving broadcast/multicast communications, a plurality of radio network temporary identifiers (RNTIs) that are respectively associated with a plurality of beams;
   receiving a first broadcast/multicast communication, of the broadcast/multicast communications, associated with a broadcast/multicast control channel via a physical downlink shared channel (PDSCH) in accordance with the broadcast/multicast scheduling configuration for the PDCCH,
      the broadcast/multicast control channel being associated with a first set of RNTIs of the plurality of RNTIs; and
   receiving a second broadcast/multicast communication, of the broadcast/multicast communications, associated with a broadcast/multicast traffic channel via the PDSCH in accordance with the broadcast/multicast scheduling configuration for the PDCCH,
      the broadcast/multicast traffic channel being associated with a second set of RNTIs of the plurality of RNTIs.

2. The method of claim 1, further comprising receiving control information that identifies a particular RNTI of the plurality of RNTIs, wherein one or more of the first broadcast/multicast communication or the second broadcast/multicast communication is received in accordance with the particular RNTI.

3. The method of claim 1, wherein the broadcast/multicast scheduling configuration identifies a plurality of time offsets associated with the plurality of beams.

4. The method of claim 3, further comprising receiving control information that identifies a particular time offset of the plurality of time offsets, wherein one or more of the first broadcast/multicast communication or the second broadcast/multicast communication is received in accordance with the particular time offset.

5. The method of claim 1, wherein the broadcast/multicast scheduling configuration provides information relating to identification of repetitions of one or more of the first broadcast/multicast communication or the second broadcast/multicast communication.

6. The method of claim 1, further comprising receiving control information that identifies a bandwidth part (BWP), wherein one or more of the first broadcast/multicast communication or the second broadcast/multicast communication is received in accordance with the BWP.

7. The method of claim 1, wherein the broadcast/multicast scheduling configuration identifies a frequency-hopping pattern within a bandwidth part (BWP) or a frequency-hopping pattern across multiple BWPs.

8. The method of claim 1, wherein the broadcast/multicast scheduling configuration identifies a plurality of control resource set (CORESET) configurations and search space configurations for a bandwidth part (BWP), and wherein a CORESET configuration of the plurality of CORESET configurations identifies a beam configuration.

9. The method of claim 8, further comprising receiving control information that identifies a particular CORESET configuration and search space configuration of the plurality of CORESET configurations and search space configurations, wherein one or more of the first broadcast/multicast communication or the second broadcast/multicast communication is received in accordance with the particular CORESET configuration and search space configuration.

10. The method of claim 1, wherein the broadcast/multicast scheduling configuration identifies a mapping of unicast hybrid automatic repeat request (HARQ) process identifiers to broadcast/multicast HARQ process identifiers associated with one or more of the first broadcast/multicast communication or the second broadcast/multicast communication.

11. The method of claim 1, wherein the broadcast/multicast scheduling configuration identifies a timeline configuration that indicates a first time duration between processing of the PDCCH and receiving the first broadcast/multicast communication, and a second time duration between receiving the first broadcast/multicast communication and transmitting acknowledgment or negative-acknowledgment feedback, and wherein each of the first time duration and the second time duration is different than a corresponding time duration for a unicast transmission.

12. The method of claim 1, further comprising receiving, from a first group of one or more cells with a single frequency network (SFN), control information that schedules one or more of the first broadcast/multicast communication or the second broadcast/multicast communication in the PDSCH, wherein the one or more of the first broadcast/multicast communication or the second broadcast/multicast communication is received from a second group of one or more cells with an SFN.

13. A method of wireless communication performed by a network entity, comprising:
 transmitting a broadcast or a multicast (broadcast/multicast) scheduling configuration for a physical downlink control channel (PDCCH),
  the broadcast/multicast scheduling configuration identifying, for broadcast/multicast communications, a plurality of radio network temporary identifiers (RNTIs) that are respectively associated with a plurality of beams;
 transmitting a first broadcast/multicast communication, of the broadcast/multicast communications, associated with a broadcast/multicast control channel via a physical downlink shared channel in accordance with the broadcast/multicast scheduling configuration for the PDCCH,
  the broadcast/multicast control channel being associated with a first set of RNTIs of the plurality of RNTIs; and
 transmitting a second broadcast/multicast communication, of the broadcast/multicast communications, associated with a broadcast/multicast traffic channel via the PDSCH in accordance with the broadcast/multicast scheduling configuration for the PDCCH,
  the broadcast/multicast traffic channel being associated with a second set of RNTIs of the plurality of RNTIs.

14. The method of claim 13, further comprising transmitting control information that identifies a particular RNTI of the plurality of RNTIs, wherein one or more of the first broadcast/multicast communication or the second broadcast/multicast communication is transmitted in accordance with the particular RNTI.

15. The method of claim 13, wherein the broadcast/multicast scheduling configuration identifies a plurality of time offsets associated with the plurality of beams.

16. The method of claim 15, further comprising transmitting control information that identifies a particular time offset of the plurality of time offsets, wherein one or more of the first broadcast/multicast communication or the second broadcast/multicast communication is transmitted in accordance with the particular time offset.

17. The method of claim 13, wherein the broadcast/multicast scheduling configuration provides information relating to identification of repetitions of one or more of the first broadcast/multicast communication or the second broadcast/multicast communication.

18. The method of claim 13, further comprising transmitting control information that identifies a bandwidth part (BWP), wherein one or more of the first broadcast/multicast communication or the second broadcast/multicast communication is transmitted in accordance with the BWP.

19. The method of claim 13, wherein the broadcast/multicast scheduling configuration identifies a frequency-hopping pattern within a bandwidth part (BWP) or a frequency-hopping pattern across multiple BWPs.

20. The method of claim 13, wherein the broadcast/multicast scheduling configuration identifies a plurality of control resource set (CORESET) configurations and search space configurations for a bandwidth part (BWP), and wherein a CORESET configuration of the plurality of CORESET configurations identifies a beam configuration.

21. The method of claim 20, further comprising transmitting control information that identifies a particular CORESET configuration and search space configuration of the plurality of CORESET configurations and search space configurations, wherein one or more of the first broadcast/multicast communication or the second broadcast/multicast communication is transmitted in accordance with the particular CORESET configuration and search space configuration.

22. The method of claim 13, wherein the broadcast/multicast scheduling configuration identifies a mapping of unicast hybrid automatic repeat request (HARQ) process identifiers to broadcast/multicast HARQ process identifiers associated with one or more of the first broadcast/multicast communication or the second broadcast/multicast communication.

23. The method of claim 13, wherein the broadcast/multicast scheduling configuration identifies a timeline configuration that indicates a first time duration between processing of the PDCCH and a reception of the first broadcast/multicast communication by a user equipment (UE), and a second time duration between the reception of the first broadcast/multicast communication and a transmission of acknowledgment or negative-acknowledgment feedback by the UE, and wherein each of the first time duration and the second time duration is different than a corresponding time duration for unicast transmissions.

24. A user equipment (UE) for wireless communication, comprising:
 a memory; and
 one or more processors operatively coupled to the memory, the one or more processors configured to:

receive a broadcast or a multicast (broadcast/multicast) scheduling configuration for a physical downlink control channel (PDCCH), the broadcast/multicast scheduling configuration identifying, for receiving broadcast/multicast communications a plurality of radio network temporary identifiers (RNTIs) that are respectively associated with a plurality of beams;

receive a first broadcast/multicast communication, of the broadcast/multicast communications, associated with a broadcast/multicast control channel via a physical downlink shared channel in accordance with the broadcast/multicast scheduling configuration for the PDCCH, the broadcast/multicast control channel being associated with a first set of RNTIs of the plurality of RNTIs; and receive a second broadcast/multicast communication, of the broadcast/multicast communications, associated with a broadcast/multicast traffic channel via the PDSCH in accordance with the broadcast/multicast scheduling configuration for the PDCCH, the broadcast/multicast traffic channel being associated with a second set of RNTIs of the plurality of RNTIs.

25. The UE of claim 24, wherein the broadcast/multicast scheduling configuration identifies a mapping of unicast hybrid automatic repeat request (HARQ) process identifiers to broadcast/multicast HARQ process identifiers associated with one or more of the first broadcast/multicast communication or the second broadcast/multicast communication.

26. The UE of claim 24, wherein the broadcast/multicast scheduling configuration identifies a plurality of time offsets associated with the plurality of beams.

27. The UE of claim 24, wherein the broadcast/multicast scheduling configuration identifies a plurality of control resource set (CORESET) configurations and search space configurations for a bandwidth part (BWP), and wherein a CORESET configuration of the plurality of CORESET configurations identifies a beam configuration.

28. A network entity for wireless communication, comprising:

a memory; and one or more processors operatively coupled to the memory, the one or more processors configured to:

transmit, a broadcast or a multicast (broadcast/multicast) scheduling configuration for a physical downlink control channel (PDCCH), the broadcast/multicast scheduling configuration identifying, for broadcast/multicast communications, a plurality of radio network temporary identifiers (RNTIs) that are respectively associated with a plurality of beams; and transmit a first broadcast/multicast communication, of the broadcast/multicast communications, associated with a broadcast/multicast control channel via a physical downlink shared channel in accordance with the broadcast/multicast scheduling configuration for the PDCCH, the broadcast/multicast control channel being associated with a first set of RNTIs of the plurality of RNTIs; and transmitting a second broadcast/multicast communication, of the broadcast/multicast communications, associated with a broadcast/multicast traffic channel via the PDSCH in accordance with the broadcast/multicast scheduling configuration for the PDCCH, the broadcast/multicast traffic channel being associated with a second set of RNTIs of the plurality of RNTIs.

29. The network entity of claim 28, wherein the broadcast/multicast scheduling configuration identifies a mapping of unicast hybrid automatic repeat request (HARQ) process identifiers to broadcast/multicast HARQ process identifiers associated with one or more of the first broadcast/multicast communication or the second broadcast/multicast communication.

30. The network entity of claim 28, wherein the broadcast/multicast scheduling configuration identifies a plurality of control resource set (CORESET) configurations and search space configurations for a bandwidth part (BWP), and wherein a CORESET configuration of the plurality of CORESET configurations identifies a beam configuration.

* * * * *